Sept. 1, 1953  A. P. KRUEGER  2,650,433
TAPE DISPENSING MECHANISM
Filed Jan. 18, 1950
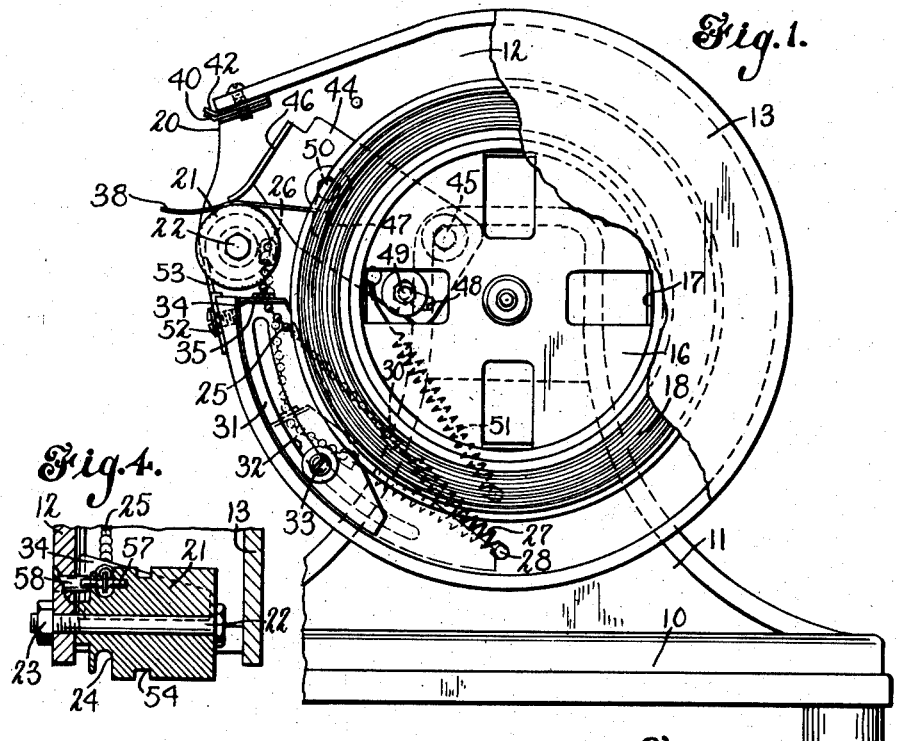
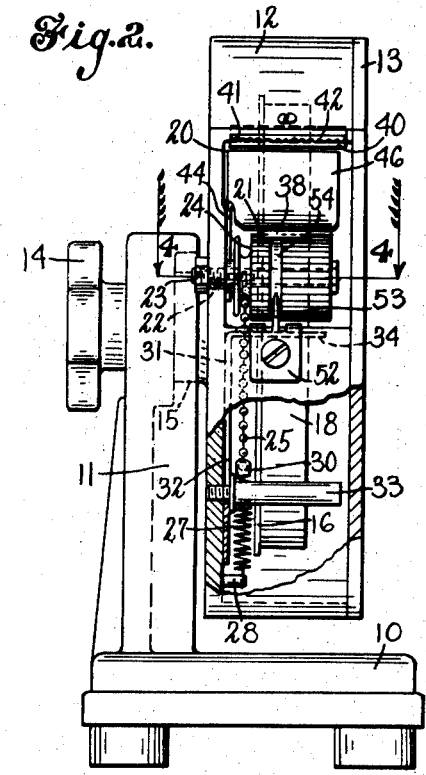
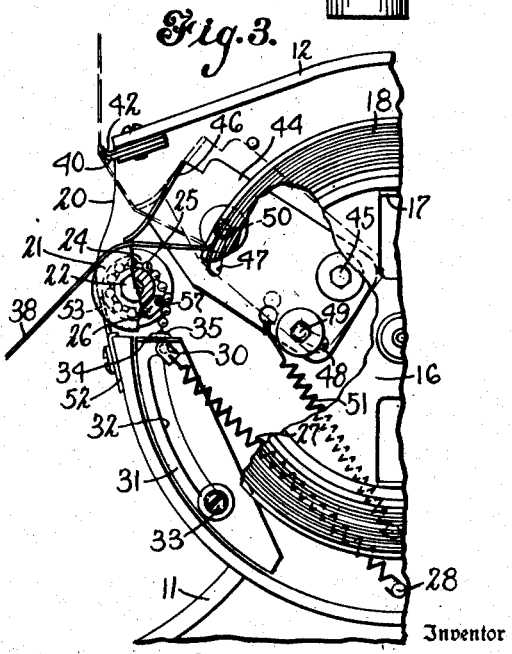
Inventor
Alfred P. Krueger
By Rockwell Bartholow
Attorneys Patented Sept. 1, 1953

2,650,433

UNITED STATES PATENT OFFICE 2,650,433

TAPE DISPENSING MECHANISM

Alfred P. Krueger, Stratford, Conn., assignor to Derby Sealers, Incorporated, Derby, Conn., a corporation of Connecticut Application January 18, 1950, Serial No. 139,302

7 Claims. (Cl. 33—131)

This invention relates to tape-dispensing mechanisms and more particularly to a device for dispensing pressure-sensitive tape, or tape which is tacky upon one surface.

As illustrated, the device comprises a pull-type dispenser in that the tape is designed to be grasped by the operator and drawn manually from the supply roll rotatably supported in the housing provided for that purpose. A measuring roll is rotatably mounted adjacent the opening in the housing through which the tape is drawn, and the supply roll is so supported that the tape is normally drawn from the roll with its tacky surface in contact with this roller which causes the latter to rotate and the amount of tape drawn from the machine is measured by the limiting of the rotation of the roller.

Novel means are provided for adjustably limiting the rotation of the roller so that the device may be set to dispense a piece of tape of the proper length, and when the dispensed tape is drawn away from the roller so that the latter is released, it is automatically returned to its normal position, or position of rest, in order to be ready for a subsequent measuring operation.

A severing blade is provided above the opening in the case or housing through which the tape is drawn, and a stripping mechanism is provided which normally holds the tape against the measuring roll under spring pressure by engagement with the non-tacky side of the tape, the stripper being movably mounted in the case so that it is raised from its normal position when the tape is raised or moved toward the severing blade. Also, a stripping device is provided which stands forwardly of the measuring roller and prevents the free end of the tape from curving downwardly and inwardly against this roller so that this free end of the tape will always stand in a position in which it may be readily grasped by the operator.

One object of the invention is to provide a new and improved device for dispensing tape which is adhesive or tacky upon one surface.

A further object of the invention is the provision of a device of the character described so constructed that a measured length of tape may be drawn from the dispenser.

A still further object of the invention is to provide a tape dispenser which will dispense measured lengths of tape, the lengths being measured by means of a measuring roller in contact with the tacky side of the tape, the device being provided with novel means to adjustably limit the rotation of the measuring roller so that predetermined lengths of tape may be drawn from the machine.

A still further object of the invention is to provide a tape-dispensing machine of the character described having a stripper to prevent the free end of the tape from adhering to the front of the measuring roll so that the free end may be grasped by the operator and the tape drawn from the machine.

To these and other ends the invention consists in the novel features and combinations of parts to be hereinafter described and claimed.

In the accompanying drawings:

Fig. 1 is a side elevational view of a tape-dispensing mechanism embodying my invention, a portion of the cover of the case being broken away to show the interior mechanism;

Fig. 2 is a front elevational view of the same, with some parts being shown in section;

Fig. 3 is a view similar to Fig. 1 but showing the parts in another position; and Fig. 4 is a sectional view on line 4—4 of Fig. 2.

To illustrate a preferred embodiment of my invention, I have shown in the drawings a tape-dispensing mechanism comprising a base 10 having a standard 11 upon which is supported a casing or housing 12 of generally circular shape, the casing being closed at one side by a removable cover 13. The casing is secured in place by means of a screw 14 which passes through the standard 11, this screw being threaded into a boss 15 secured to the casing 12. It will be understood that by loosening the screw 14 the casing may be rotatably adjusted to the desired position with respect to the standard and base.

Rotatably mounted within the casing is a roll holder 16 which is of disk-like form and which is provided with laterally projecting arms 17 to support a supply roll of tape 18.

The casing 12 is provided with an opening 20 at its forward portion, through which opening the free end of the tape is adapted to be drawn as will be hereinafter explained. Adjacent this opeing a knurled measuring roller 21 is rotatably supported by the casing, this roll having an opening therethrough to rotatably receive a screw 22 which is threaded in the wall of the casing and held in place by a lock nut 23 so that the roller will be held between the wall of the casing and the head of the screw 22.

Adjacent one end, as shown more especially in Fig. 2, the roller is provided with an annular groove 24 and within this groove one end of a bead chain 25 is secured to the roller, as shown at 26 in Fig. 1, so that, as the roller rotates, the chain will be wound up about the axis of the roller in the groove 24.

The other end of the chain 25 is secured to one end of a spring 27 and the other end of the spring is secured to the housing at 28 so that, as the chain is wound up about the roller 21, the spring 27 will be tensioned and will tend to rotate the roller in a reverse direction. As shown in Fig. 3, a stop member 30 is provided at the end of the chain adjacent the spring 27, which stop member will tend to limit the winding of the chain about the roller 21.

An abutment plate 31 is adjustably secured to the casing, this member being provided with an arcuate slot 32 in which is received a screw or threaded post 33 so that this member may be adjusted with respect to the case as permitted by the length of the slot 32. At the upper end of the abutment member 31 is provided a laterally extending abutment arm 34 provided with an opening 35 through which the chain 25 extends. This opening is, however, too small to permit the stop member 30 to pass therethrough and, hence, the movement of the roller in a forward direction will be checked when the stop member 30 reaches the abutment member 34, as shown in Fig. 3. The position of the abutment member 34, as shown in Fig. 3, is such as to permit the greatest movement of the chain 25 and, therefore, the dispensing of the longest length of tape permitted by the device. To dispense shorter lengths of tape, the screw 33 is loosened and the member 31 moved downwardly as permitted by the slot 32 until the desired position is reached, when this member may be again secured in place by tightening the screw 33 so that any desired length of tape may be dispensed as will be allowed by the length of the slot 32.

As the free end of the tape 38 comes from the supply roll, its lower or tacky surface is in contact with the measuring roller 21 and the drawing of the tape from the supply roll by the operator will effect the rotation of this roller. The tape may be drawn from the roll until the stop member 30 contacts the abutment 34 which will positively prevent further rotation of the measuring roller and the resistance offered to the pull upon the free end of the tape will inform the operator that the predetermined length of tape has been dispensed.

At the upper side of the opening 20 a severing knife 40 is secured to the housing, the forward edge of which is serrated, as shown at 41, and the serrated edge may be protected by a guard member 42 of rubber or like flexible material which stands above the edge of the severing blade and normally extends slightly in advance thereof, as shown in Fig. 1.

In order to strip the tape from the severing blade and positively return it into contact with a surface of the measuring roller 21, stripper means are provided which consist of a plate 44 pivoted at 45 in the housing, which plate is provided with a laterally turned portion 46, the lower end of which contacts the upper non-tacky side of the tape, as shown more especially in Figs. 1 and 3. The member 44 is provided with arcuate slots 47 and 48 which receive guide pins 49 and 50 secured to the housing, so as to limit the movement of the stripper about the pivot 45. A spring 51, secured at one end to the member 44 and secured at its other end to the housing, normally urges the stripper in a counter-clockwise direction about its pivot 45 so as to urge the member 46 into contact with the tape and maintain the latter against the measuring roller 21, as shown in Figs. 1 and 3.

It will sometimes occur that after a severing operation the free end 38 of the tape will tend to drop downwardly or inwardly into contact with the surface of the measuring roller 21 and cling to this surface so tightly that it will be difficult for the operator to grasp the free end of the tape for a dispensing operation. To prevent this occurrence, a plate 52 is secured to the front of the base adjacent the lower end of the opening 20, this plate being provided with a stripping finger 53, the free end of which as shown rests in a groove 54 of the roller 21. This stripping finger 53 will prevent the free end of the tape from wrapping itself about the roller 21 and will hold it away from the surface of the roller so that the operator may get his finger behind it.

The upper end of the chain 25 is secured to a pin 57 (Fig. 4) secured in the roller 21, and the end of this pin projects from the roller so as to contact with the projecting end of a second pin 58 secured to the housing or casing 12. When the roller is rotated in a reverse direction by the spring 27, the pin 57 will engage the pin 58 so that the latter serves as a stop to determine the initial position of the roller.

In operation, the parts will normally stand in the position shown in Fig. 1 in which the free end 38 of the tape projects from the machine ready to be grasped by the operator. The tape will be held against this roller by the stripper member 46 under the impulse of the spring 51. If necessary the screw 33 is loosened and the abutment plate 31 may be moved as necessary to set the abutment 34 at the proper place to dispense the desired length of tape. If a relatively short length of tape is desired, this plate will be set to the position shown in dotted lines in Fig. 1.

The operator now grasps the free end of the tape and draws it through the opening 20 with the tacky side of the tape in contact with the measuring roller 21. This will cause the measuring roller 21 to rotate and the chain 25 to be wound up in the groove 24 of the roller until the stop member 30 contacts the lower face of the abutment 34, as shown in Fig. 3. The rotation of the roller will then be checked and the resistance to further drawing of the tape from the supply roll will advise the operator that the desired length has been dispensed.

The operator now moves the tape toward the severing blade, as shown in dotted lines in Fig. 3. When the tape is drawn away from the surface of the measuring roll 21, the latter will be rotated in a clockwise or reverse direction, as shown in Fig. 3, by the spring 27 attached to the chain 25 so that the measuring roller will have been returned to its normal position occupied at the beginning of the dispensing operation.

When the tape is drawn upwardly against the severing knife, the stripper member 46 is also drawn upwardly, as shown in dotted lines in Fig. 3, against the tension of the spring 51. As soon, however, as the dispensed portion of the tape has been severed, this spring will return the stripper 46 to the position in Fig. 1 which will strip the tape from the severing blade and move it against the surface of the measuring roller, to which it will adhere, with a free end extending forwardly from the roller to be grasped by the operator for a further operation.

While I have shown and described a preferred embodiment of my invention, it will be understood that it is not to be limited to all of the details shown, but is capable of modification and variation within the spirit of the invention and within the scope of the claims.

What I claim is:

1. A machine for dispensing pressure-sensitive tape comprising a housing, means thereon for supporting a supply roll of tape, a roller rotatably mounted on the housing to which the tacky side of the tape adheres as it comes from the supply roll, said roller being rotated in a forward direction when the tape is drawn thereover, and means to limit forward rotation of the roller comprising a flexible member within the housing connected at one end to the roller and having a stop member thereon, an abutment on the housing to engage said stop member and a tension spring secured to the other end of said member and to the housing tending to rotate said roller in a reverse direction.

2. A machine for dispensing pressure-sensitive tape comprising a housing, means thereon for supporting a supply roll of tape, a roller rotatably mounted on the housing to which the tacky side of the tape adheres as it comes from the supply roll, said roller being rotated in a forward direction when the tape is drawn thereover, means to limit forward rotation of the roller comprising a flexible member within the housing connected at one end to the roller to be wound about the axis of the roller, an abutment member on the housing to engage a part on said flexible member, and a spring secured at one end to said member and at the other end to the housing tending to rotate the roller in a reverse direction.

3. A machine for dispensing pressure-sensitive tape comprising a housing, means thereon for supporting a supply roll of tape, a roller rotatably mounted on the housing to which the tacky side of the tape adheres as it comes from the supply roll, said roller being rotated in a forward direction when the tape is drawn thereover, means to limit forward rotation of the roller comprising a flexible member connected at one end to the roller to be wound about the axis of the roller, and adjustable means to limit movement of said member, said last-named means comprising an abutment member mounted on the housing and a stop on the flexible member to engage said abutment.

4. A machine for dispensing pressure-sensitive tape comprising a housing, means thereon for supporting a supply roll of tape, a roller rotatably mounted on the housing to which the tacky side of the tape adheres as it comes from the supply roll, said roller being rotated in a forward direction when the tape is drawn thereover, means to limit forward rotation of the roller comprising a flexible member within the housing connected at one end to the roller to be wound about the axis of the roller, adjustable means within the housing to limit movement of said member, and a spring connected to said flexible member to urge said roller in a reverse direction.

5. A machine for dispensing pressure-sensitive tape comprising a housing, means thereon for supporting a supply roll of tape, a roller rotatably mounted on the housing to which the tacky side of the tape adheres as it comes from the supply roll, said roller being rotated in a forward direction when the tape is drawn thereover, a flexible member secured at one end to said roller and having a stop thereon, means to engage said stop to limit rotation of the roller, said means comprising an abutment adjustably mounted on the housing, and a spring secured to the other end of said member tending to rotate said roller in a reverse direction.

6. A machine for dispensing pressure-sensitive tape comprising a housing, means thereon for supporting a supply roll of tape, a roller rotatably mounted on the housing to which the tacky side of the tape adheres as it comes from the supply roll, said roller being rotated in a forward direction when the tape is drawn thereover, a flexible member secured at one end to said roller and having a stop thereon, and means to engage said stop to limit rotation of the roller, said means comprising an abutment adjustable on the housing having an opening therein through which said member passes and said opening being of a size to prevent the passage of said stop.

7. A machine for dispensing pressure-sensitive tape comprising a housing, means thereon for supporting a supply roll of tape, a roller rotatably mounted on the housing to which the tacky side of the tape adheres as it comes from the supply roll, said roller being rotated in a forward direction when the tape is drawn thereover, a flexible member secured at one end to said roller and having a stop thereon, means to engage said stop to limit rotation of the roller, said means comprising an abutment adjustably mounted on the housing having an opening therein through which said flexible member passes, said opening being of a size to prevent the passage of said stop member, and a spring secured to the other end of said flexible member tending to rotate said roller in a reverse direction.

ALFRED P. KRUEGER.

References Cited in the file of this patent

UNITED STATES PATENTS

| Number | Name | Date |
|---|---|---|
| Re. 16,774 | Uttz | Oct. 18, 1927 |
| 1,222,957 | Kramer | Apr. 17, 1917 |
| 1,558,969 | Entwhistle et al. | Oct. 27, 1925 |
| 2,233,361 | Anderson et al. | Feb. 25, 1941 |
| 2,348,355 | Miller | May 9, 1944 |
| 2,547,583 | Krueger | Apr. 3, 1951 |